May 12, 1931.　　　J. N. MONTERIO　　　1,805,411
MEAT CUTTER
Filed March 11, 1929　　2 Sheets-Sheet 2
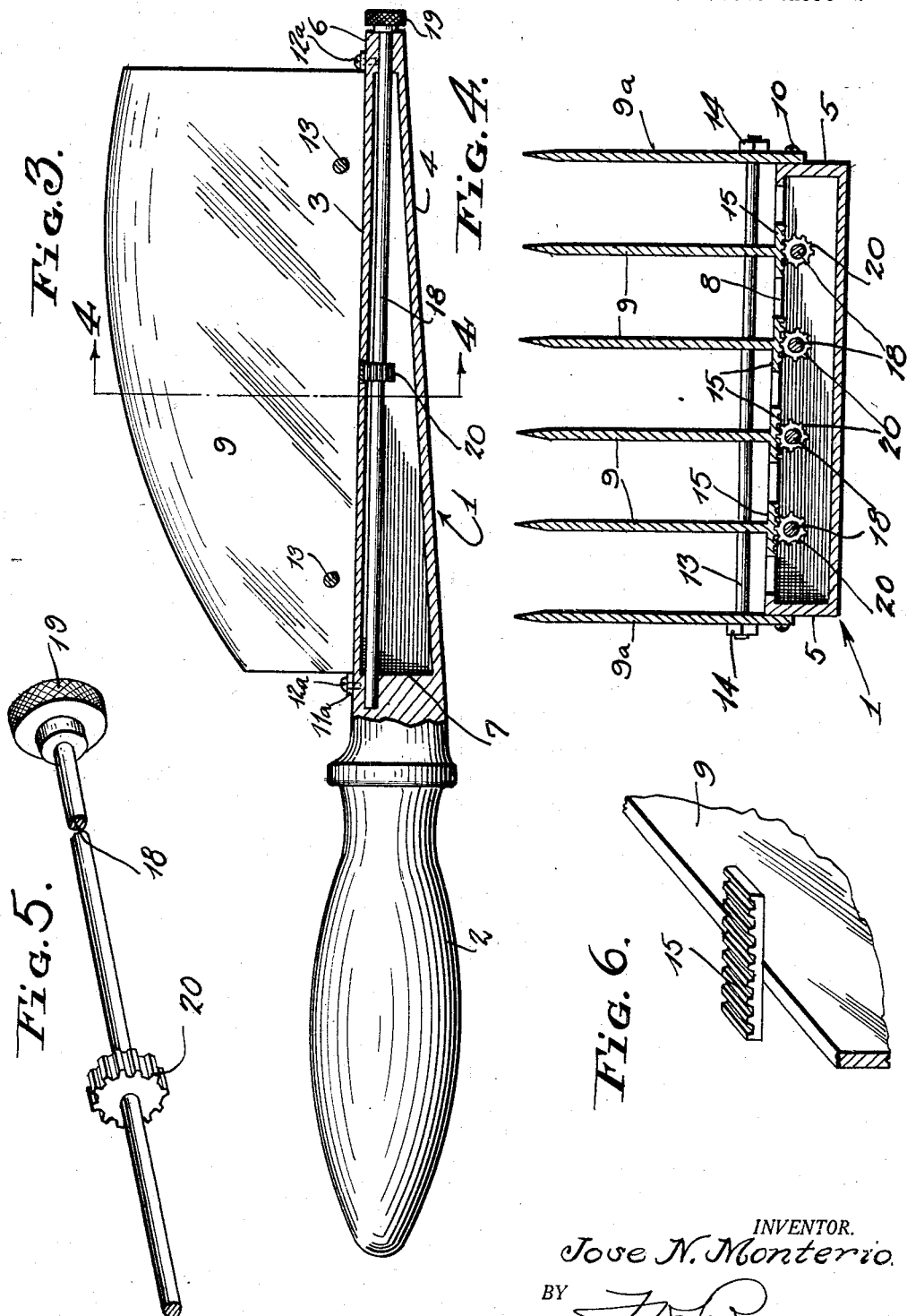
INVENTOR.
Jose N. Monterio.
BY
ATTORNEY.

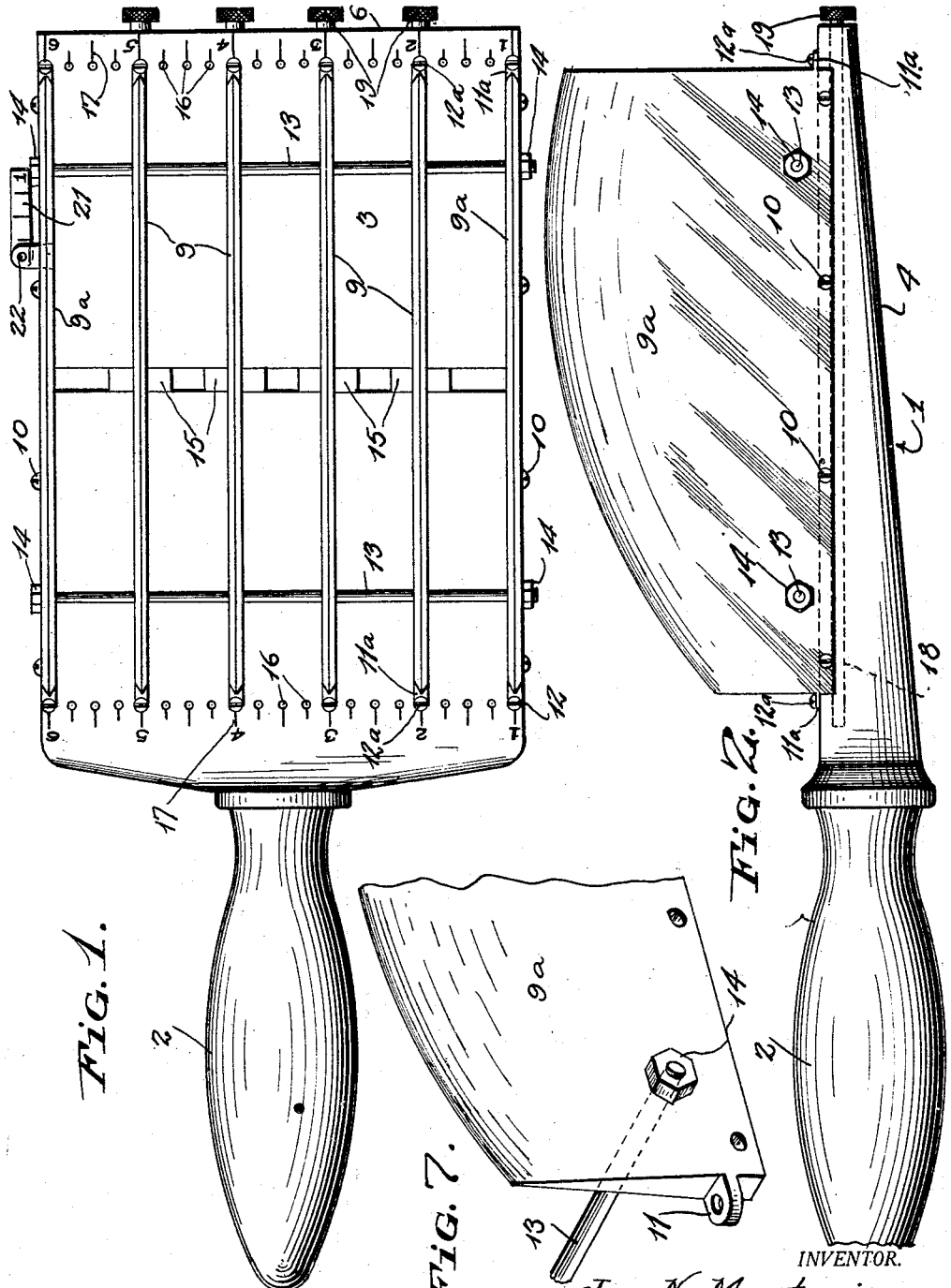

Patented May 12, 1931

1,805,411

UNITED STATES PATENT OFFICE

JOSÉ N. MONTERIO, OF NEW BEDFORD, MASSACHUSETTS

MEAT CUTTER

Application filed March 11, 1929. Serial No. 346,237.

This invention relates to certain new and useful improvements in meat cutters and has for its primary object to provide a cutter or slicer for boneless meat wherein a plurality or gang of knife blades produce a plurality of meat slices at one operation, such as beef steaks or the like.

A further object of the invention is to provide a meat cutter or slicer of the above type in which the blades are adjustably mounted in directions toward each other for varying the thickness of the slice of meat with the blades securely held in adjusted position.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a bottom plan view of a meat cutter or slicer constructed in accordance with the present invention;

Figure 2 is a side elevational view of the same showing the general contour of the knife blade with the end unadjustable blade secured to the frame backing of the handle;

Figure 3 is a vertical longitudinal sectional view showing the rack and pinion mechanism for laterally shifting the slicing blades toward each other and the screw anchor means for the ends of each blade;

Figure 4 is a cross-sectional view taken on line 4—4 of Figure 3 showing the independent adjustment for each blade;

Figure 5 is a perspective view of one of the blade adjusting rods carrying a pinion;

Figure 6 is a fragmentary perspective view of one of the slicing blades showing the rack bar carried by one edge thereof to be engaged by the pinion on the adjusting rod; and Figure 7 is a fragmentary perspective view of one of the end slicing blades with the guide rod for the intermediate blades set therein.

Referring more in detail to the accompanying drawings, the reference numeral 1 designates the hollow backing of the blade holder to one end of which a handle 2 is attached, the hollow backing 1 being rectangular in plan view as illustrated in Figure 1 and comprising top and bottom walls 3 and 4 respectively, side walls 5, and front and rear walls 6 and 7 respectively. The top wall 3 of the hollow backing 1 is provided with a transverse opening 8 extending between the side walls 5 to accommodate the reception of a part of the intermediate slicing blades 9.

A side blade 9a is secured to the side wall 5 of the hollow backing by fastening screws 10 while apertured lugs 11 on the ends of the blade 9a receive fastening devices that enter the top wall 3 of the hollow backing as shown in Figures 1 and 2.

A transverse rod 13 extends between adjacent ends of the opposite side blades 9a above the hollow backing and is retained in position by end nuts 14, the transverse rods 13 passing through openings in the intermediate blades 9 forming guides therefor. Each blade 9 as shown in detail in Figure 6 has a rack bar 15 extending transversely of its lower edge intermediate the ends thereof that extend into the cross slot 8 in the top wall 3 of the hollow backing as shown in Figure 3, the opposite lower edge of each blade 9 being provided with an apertured lug 11a to receive a fastening screw 12a selectively positioned in openings extending in lines transversely of the top wall 3 of the backing and with which lineal graduations 17 are associated for determining the distance between each blade and the thickness of a slice of meat to be cut.

The adjusting means for laterally shifting each blade 9 toward and away from each other comprises a rod 18 for each blade 9, the rods 18 being journaled in the end walls 6 and 7 of the hollow backing as shown in Figure 3, with the end projecting beyond the end wall 6 provided with a knurled button head 19. A pinion 20 is fixed to each rod 18 and is in engagement with an associated rack bar 15 of the adjacent blade 9 so that when the rods 18 are rotated by the knurled button heads 19, the rack bars 15 are shifted in the desired directions and carried with the associated blade 9.

The side blades 9a are rigidly secured to the hollow backing by the fastening screws 10 while the intermediate blades 9 are adjustable. To shift the intermediate blades 9, the screws 12a are loosened or disengaged from the openings 16 in the top wall of the hollow backing and the several knurled button heads 19 rotated for operating the rods 18 with the pinions 20 carried by the rods engaging the rack bars 15 to shift the blades 9, such movement determining in connection with the scale 17 the thickness of the slice of meat to be cut. When the proper adjustment has been obtained, it being understood that the blades 9 are guided in their movement on the transverse rods 13, the set screws 12a are moved into an associated opening 16 in the hollow backing and the blades 9 are again rigidly mounted. The first edge slice of meat has its thickness determined by the gage arm 21 pivotally mounted as at 22 upon one side wall 5 of the backing and is intended to be thrown outwardly at right angles to the adjacent side wall for measuring the first or initial thickness of the slice of meat to be cut.

From the above detailed description, it is believed that the construction and operation of the device will at once be apparent, and while there is herein shown and described the preferred embodiments of the present invention, it is nevertheless to be understood that minor changes may be made therein without departing from the spirit and scope of the invention as claimed.

I claim:—

1. In a meat slicer, a backing, edge blades fixed to the backing, intermediate blades adjustable transversely of the backing, and independent means for adjusting each blade, each intermediate blade adjusting means including rack and pinion mechanism operable from one end of the backing.

2. In a meat slicer, a backing, edge blades fixed to the backing, intermediate blades adjustable transversely of the backing, independent means for adjusting each intermediate blade, and a gage arm pivoted to one edge of the backing to determine the thickness of the first slice, each blade adjusting means including rack and pinion mechanism operable from one end of the backing.

3. In a meat slicer, a backing, edge blades fixed to the backing, intermediate blades adjustable transversely of the backing, independent means for adjusting each intermediate blade, said backing being hollow with a transverse opening in the top wall, a rack bar on each blade extending into the opening, and a manually operable pinion engaged with the rack bar.

4. In a meat slicer, a backing, edge blades fixed to the backing, intermediate blades adjustable transversely of the backing, independent means for adjusting each intermediate blade, a gage arm pivoted to one edge of the backing to determine the thickness of the first slice, said backing being hollow with a transverse opening in the top wall, a rack bar on each blade extending into the opening, and a manually operable pinion engaged with the rack bar.

5. In a meat slicer, a backing, edge blades fixed to the backing, intermediate blades adjustable transversely of the backing, independent means for adjusting each intermediate blade, said backing being hollow with a transverse opening in the top wall, a rack bar on each blade extending into the opening, a shaft for each blade journalled longitudinally of the backing, and a pinion on each shaft engaged with the adjacent blade rack bar.

6. In a meat slicer, a backing, edge blades fixed to the backing, intermediate blades, means for adjusting each intermediate blade, a gage arm pivoted to one edge of the backing to determine the thickness of the first slice, said backing being hollow with a transverse opening in the top wall, a rack bar on each blade extending into the opening, a shaft for each blade journalled longitudinally of the backing, and a pinion on each shaft engaged with the adjacent blade rack bar.

7. In a meat slicer, a backing, edge blades fixed to the backing, intermediate blades adjustable transversely of the backing, independent means for adjusting each intermediate blade, said backing being hollow with a transverse opening in the top wall, a rack bar on each blade extending into the opening, a shaft for each blade journalled longitudinally of the backing, a pinion on each shaft engaged with the adjacent blade rack bar, means for anchoring the end of the blades to the backing, and gage lineations on the backing at each end of the blades for determining the distance between the adjustable blades.

8. In a meat slicer, a backing, edge blades fixed to the backing intermediate laterally adjustable blades, intermediate means for adjusting each intermediate blade, a gage arm pivoted to one edge of the backing to determine the thickness of the first slice, said backing being hollow with a transverse opening in the top wall, a rack bar on each blade extending into the opening, a shaft for each blade journalled longitudinally of the backing, a pinion on each shaft engaged with the adjacent blade rack bar, means for anchoring the end of the blades to the backing, and gage lineations on the backing at each end of the blades for determining the distance between the adjustable blades.

In testimony whereof I affix my signature.

JOSÉ N. MONTERIO.